(12) United States Patent
Bae

(10) Patent No.: US 9,386,125 B2
(45) Date of Patent: Jul. 5, 2016

(54) METHOD FOR TRANSMITTING PACKET-BASED MEDIA DATA HAVING HEADER IN WHICH OVERHEAD IS MINIMIZED

(75) Inventor: Seong Jun Bae, Daejeon-si (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 260 days.

(21) Appl. No.: 14/126,207

(22) PCT Filed: Jun. 13, 2012

(86) PCT No.: PCT/KR2012/004670
§ 371 (c)(1),
(2), (4) Date: Dec. 13, 2013

(87) PCT Pub. No.: WO2012/173391
PCT Pub. Date: Dec. 20, 2012

(65) Prior Publication Data
US 2014/0133489 A1    May 15, 2014

(30) Foreign Application Priority Data

Jun. 13, 2011 (KR) .................. 10-2011-0056661
Jun. 13, 2012 (KR) .................. 10-2012-0063213

(51) Int. Cl.
*H04L 29/06* (2006.01)
(52) U.S. Cl.
CPC .............. *H04L 69/04* (2013.01); *H04L 65/608* (2013.01)
(58) Field of Classification Search
None
See application file for complete search history.

(56) References Cited

U.S. PATENT DOCUMENTS

| | | | | |
|---|---|---|---|---|
| 7,876,704 B1* | 1/2011 | Bims | ........................ | H04B 7/022 370/254 |
| 7,983,256 B2* | 7/2011 | Kimura | ................... | H04H 20/16 370/389 |
| 2002/0023270 A1* | 2/2002 | Thomas | ................. | H04N 7/163 725/95 |
| 2004/0153360 A1* | 8/2004 | Schumann | ............. | G06Q 30/02 725/90 |

(Continued)

FOREIGN PATENT DOCUMENTS

| KR | 1020070033322 A | 3/2007 |
|---|---|---|
| KR | 100937045 A | 1/2010 |
| KR | 1020100033447 A | 3/2010 |

OTHER PUBLICATIONS

Stefano Battista et al., "MPEG-4: A Multimedia Standard for the Third Millennium, Part 1," MultiMedia, IEEE, Oct.-Dec. 1999, pp. 74-83, vol. 6, Issue 4, IEEE.

*Primary Examiner* — Dung B Huynh
(74) *Attorney, Agent, or Firm* — William Park & Associates Patent Ltd.

(57) ABSTRACT

Provided is a method for transmitting packet-based media data having a header in which an overhead is minimized. A method for media data transmission may comprise the steps of: encapsulating media data to allow a media fragment unit (MFU) header and an M-unit header to share one format; allowing an MMT payload format to include a header field for an operation which is not supported by an RTP header, and transferring the encapsulated media data from a specific entity to another entity; and controlling the transfer of the media data. Therefore, a transmission overhead is minimized, so that it is possible to efficiently transmit media data.

12 Claims, 8 Drawing Sheets

(56) References Cited

U.S. PATENT DOCUMENTS

| | | | |
|---|---|---|---|
| 2007/0053374 A1* | 3/2007 | Levi | H04L 12/6402 370/431 |
| 2008/0279181 A1* | 11/2008 | Shake | H04L 1/08 370/389 |
| 2008/0304757 A1* | 12/2008 | Chen | H04N 21/4147 382/232 |
| 2009/0122753 A1* | 5/2009 | Hughes | H04L 45/122 370/329 |
| 2011/0255558 A1* | 10/2011 | Hwang | H04L 65/60 370/474 |
| 2011/0293021 A1* | 12/2011 | Kotalwar | H04N 21/233 375/240.26 |
| 2012/0253826 A1* | 10/2012 | Kitazato | H04H 60/13 704/500 |
| 2012/0294586 A1* | 11/2012 | Weaver | H04N 5/781 386/248 |

* cited by examiner

T : Timed or Non-timed Flag
A : Anchor (Should be placed at the beginning of the transport Packet)
L : Lossless (Contents to be delivered in lossless manner)
F : Fragmented
S : Start of MU
E : End of MU

FIG. 4

```
 0                   1
 0 1 2 3 4 5 6 7 8 9 0 1 2 3 4 5
+=+=+=+=+=+=+=+=+=+=+=+=+=+=+=+=+
|              PTS               |
+=+=+=+=+=+=+=+=+=+=+=+=+=+=+=+=+
|              PTS               |
+=+=+=+=+=+=+=+=+=+=+=+=+=+=+=+=+
|             (TBD.)             |
+=+=+=+=+=+=+=+=+=+=+=+=+=+=+=+=+
```

PTS : Presentation Timestamp (32bit)

C : Control/Media Flag
S : Contains Start of MU
E : Contains End fo MU
A : Anchor Point Indicator
M : Multiple MUs in this packet

FIG. 6

```
 0                   1
 0 1 2 3 4 5 6 7 8 9 0 1 2 3 4 5
+=+=+=+=+=+=+=+=+=+=+=+=+=+=+=+=+
|          Sequence No.          |
+=+=+=+=+=+=+=+=+=+=+=+=+=+=+=+=+
|     MMT Payolad Format Header  |
|                                |
```

METHOD FOR TRANSMITTING PACKET-BASED MEDIA DATA HAVING HEADER IN WHICH OVERHEAD IS MINIMIZED

TECHNICAL FIELD

The present invention relates to a method of transporting media data and, more particularly, to a media data transport method based on a packet having a header with minimized transport overhead.

BACKGROUND ART

After the standardization of MPEG-2, a video compression standard (or audio compression standard) has been steadily developed into new standards, such as MPEG-4, H.264/AVC, and High Efficiency Video Coding (HEVC) during the past 10 years. Furthermore, each of the new standards has expanded the utilization area of the MPEG standard while forming a new market, but transport technology, such as the MPEG-2 Transport System (TS), has been widely used in the markets, such as digital broadcasting and mobile broadcasting (e.g., T-DMB and DVB-H), during the past 20 years. The MPEG-2 TS is also widely used in multimedia transport over the Internet, that is, IPTV service, which was not taken into consideration when the standard was established.

However, a current multimedia transport environment is experiencing a significant change from the multimedia transport environment when the MPEG-2 TS was developed. For example, the MPEG-2 TS standard was developed with consideration taken of multimedia data transport over an ATM network when the MPEG-2 TS standard was established, but it is very difficult to fine an example in which the MPEG-2 TS standard has been used for multimedia data transport over the ATM network. Furthermore, the MPEG-2 TS standard has some factors which are inefficient for the recent multimedia transport over the Internet because requirements, including multimedia transport using the Internet, were not taken into consideration when the MPEG-2 TS standard was established. Accordingly, in MPEG, to establish an MPEG Multimedia Transport (MMT) layer, that is, a new multimedia transport standard well-matched with a changing multimedia environment, with consideration taken of multimedia service in the Internet has been recognized as a very important subject.

An important reason why MMT standardization is in progress as described above is that the MPEG-2 TS standard established 20 years ago has not been optimized for the recent IPTV broadcasting service and Internet environment. For this reason, according to an urgent need for a multimedia transport international standard that is optimized for a multimedia transport environment in the recent various heterogeneous networks, in MPEG, MMT standardization is in progress as a new transport technology standard.

When MPEG media is transported, an E-layer and a delivery layer are necessary. The E-layer is classified into four parts; (1) a Media Fragment Unit (MFU), (2) an M-Unit, (3) an MMT Asset, and (4) an MMT package, and the delivery layer is divided into two parts; (1) an MMT Payload Format and (2) an MMT packet. The present invention discloses an MMT overhead structure in which minimized transport overhead has been taken into consideration when transporting media through the MMT layer.

DISCLOSURE

Technical Problem

The most important factor when transporting MPEG media based on a packet is to minimize transport overhead. Here, the term 'transport overhead' may be interpreted as having a meaning that a delivery framework must be designed within a range that is not significantly great (or a smaller range) from a reasonable viewpoint as compared with the existing delivery frameworks, such as an M2TS-based framework and an RTP-based framework. In a newly proposed method, a header field that provides at least the same operations and/or precision as those of the existing framework must have a size smaller than or equal to that of the existing framework.

Assuming that the E-layer and the delivery layer are classified into the four parts of encapsulation and the two parts of delivery as described above when MPEG media is transported, if a packet is constructed by simply overlapping and adding headers for the six items sequentially, the packet may have significant overhead because it includes unnecessary pieces of information other than essential information when the packet is actually transmitted. Accordingly, a packet needs to be newly defined by abbreviating only pieces of necessary overhead at the time of streaming.

Accordingly, an object of the present invention is to provide a media data transport method based on a packet having a header with minimized overhead, wherein media data is packetized and transported, but an MFU header and an M-Unit header share one format and all header fields necessary for operations not supported by an RTP header are placed in an MMT Payload Format.

Another object of the present invention is to provide an interface for media data transport based on a packet having a header with minimized overhead, wherein media data is packetized and transported, but an MFU header and an M-Unit header share one format and all header fields necessary for operations not supported by an RTP header are placed in an MMT Payload Format.

Technical Solution

A media data transport method based on a packet having a header with minimized overhead according to an embodiment of the present invention may include encapsulating media data so that a Media Fragment Unit (MFU) header and an M-Unit (MU) header share one format, including header fields for operations not supported by an RTP header in an MMT Payload Format and delivering the encapsulated media data from a specific entity to another entity, and controlling the delivery of the media data.

Advantageous Effects

In the media data transport method based on a packet having a header with minimized overhead according to the present invention, when an additional format is provided, an encoder does not need to perform a task for determining whether the additional format needs to be included up to which one of the two formats because the MFU header and the M-Unit header share one format. Furthermore, both the cases where transport is performed through the RTP and transport is performed through the MMT Packet (MMTP) can be operated because all header fields necessary for operations not supported by an RTP header are placed in the MMT Payload Format. Accordingly, transport overhead can be minimized, and media data can be efficiently transported.

DESCRIPTION OF DRAWINGS

FIG. 4 is a diagram illustrating the structure of an M-Unit Header for a system;

FIG. 6 is a diagram illustrating the structure of an MMT packet header;

MODE FOR INVENTION

Figure 1:
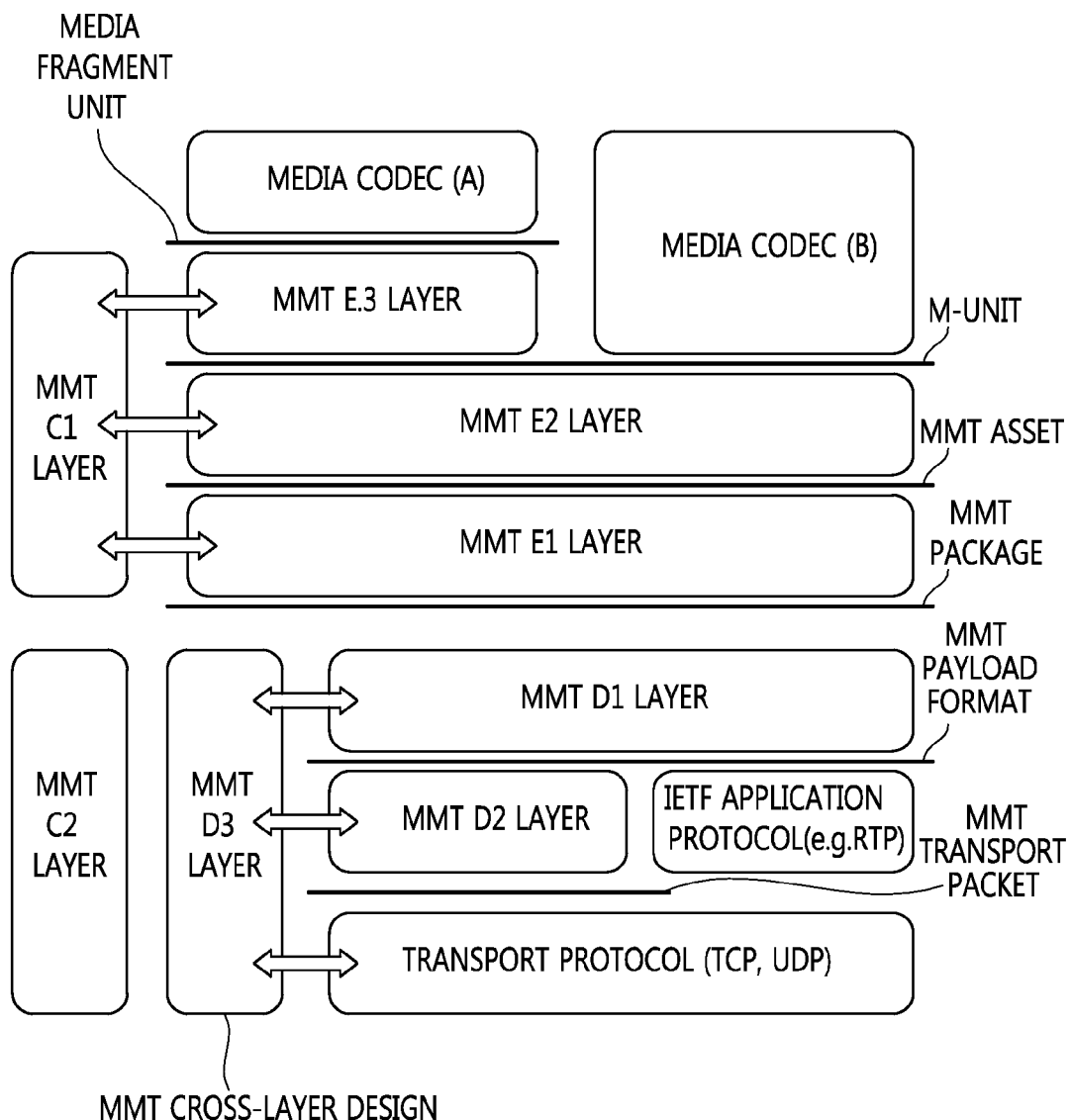
FIG. 1 is a conceptual diagram showing an MMT layer structure.

The present invention may be modified in various ways and may have several embodiments. Specific embodiments of the present invention are illustrated in the drawings and described in detail in the detailed description.

However, the present invention is not intended to be limited to the specific embodiments, and it should be understood that the present invention includes all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" and "have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, preferred embodiments of the present invention will be described in detail with reference to the accompanying drawings. In describing the present invention, in order to help overall understanding, the same reference numerals designate the same elements throughout the drawings, and a redundant description of the same elements is omitted.

Referring to FIG. 1, an MMT layer includes the functional areas of an encapsulation layer, a delivery layer, and a control layer. The MMT layer is operated over a transport layer.

The encapsulation layer (E-layer) may be responsible for functions, such as the packetization, fragmentation, synchronization, and multiplexing of transported media.

The E-layer may include an MMT E.1 Layer, an MMT E.2 Layer, and an MMT E.3 Layer, as shown in FIG. 1.

The E.3 layer generates an M-Unit by encapsulating a Media Fragment Unit (MFU) received from a media codec (A) layer.

The MFU may have a format onto which a data unit capable of being independently consumed in a media decoder can be loaded. The format of the MFU is independent from a specific codec. The MFU may become, for example, the picture or slice of video.

The M-Unit may include one MFU or a plurality of MFUs. The M-Unit may have a format onto which one access unit or a plurality of access units can be loaded. The format of the M-Unit may be independent from a specific codec.

The E.2-layer generates an MMT Asset by encapsulating the M-Unit generated from the E.3 layer.

The MMT Asset is a data entity formed of one M-Unit or a plurality of M-Units from a single data source. The MMT Asset is a data unit in which composition information and transmission characteristics are defined. The MMT Asset may correspond to Packetized Elementary Streams (PESs) and may correspond to, for example, video, audio, program information, an MPEG-U widget, an JPEG image, an MPEG 4 file format, or an MPEG Transport Stream (M2TS).

The E.1 layer generates an MMT package by encapsulating the MMT Asset generated by the E.2-layer.

The MMT package may include one MMT Asset or a plurality of MMT Assets together with pieces of supplementary information, such as composition information and transmission characteristics. The composition information includes information about a relationship between MMT Assets. If a piece of content is formed of a plurality of MMT packages, the composition information may further include information about a relationship between the plurality of MMT packages. The transmission characteristics may include transmission characteristic information that is necessary to determine a delivery condition of an MMT Asset or an MMT packet and may include, for example, a traffic description parameters and a QoS descriptor. The MMT package may correspond to the program of an MPEG-2 TS.

The delivery layer may perform, for example, the network flow multiplexing, network packetization, and QoS control of media transported over a network.

The delivery layer (D-layer) may include an MMT D.1 layer, an MMT D.2 layer, and an MMT D.3 layer as shown in FIG. 1.

The D.1 layer receives the MMT package from the E.1 layer and generates an MMT Payload Format. The MMT Payload Format is a payload format for transporting an MMT Asset and transporting information consumed by an MMT application protocol or the existing application transport protocol, such as the RTP. The MMT payload may include the fragment of the MFU together with information, such as AL-FEC.

The D.2 layer receives the MMT Payload Format generated by the D.1 layer and generates an MMT packet. The MMT packet is a data format used in the application transport protocol for the MMT layer.

The D.3 layer provides a function capable of exchanging pieces of information between layers through a cross layer design, thus supporting QoS. For example, the D.3 layer may perform QoS control by using the QoS parameters of MAC/PHY layers.

The control layer may perform functions, such as the session initialization/control/management, a trick mode based on a server and/or client, service discovery, and synchronization of transported media.

The control layer (C layer) may include an MMT C.1 layer and an MMT C.2 layer, as shown in FIG. 1.

The C.1 layer may perform functions, such as service discovery, media session initialization/termination, media session presentation/control, and an interface with the delivery (D) layer and the encapsulation (E) layer. The C.1 layer may define the formats of control messages between applications for presentation session management.

The C.2 layer may define the formats of control messages that are exchanged between the delivery end-points of D layers and that are related to flow control, delivery session management, delivery session monitoring, error control, and hybrid network synchronization control.

The C.2 layer may include delivery session establishment and release, delivery session monitoring, flow control, error control, resource reservation for an established delivery session, signaling for synchronization under a hybrid delivery environment, and signaling for adaptive delivery in order to support the operation of the D layer. The C.2 layer may provide signaling necessary between a sender and a receiver. That is, the C.2 layer may provide signaling necessary between a sender and a receiver in order to support the above-described operations of the D layer. Furthermore, the C.2 layer may be responsible for an interface function between the D layer and the E layer.

An interface for packet-based media data transport according to an embodiment of the present invention may include an E layer for encapsulating media data so that a Media Fragment Unit (MFU) header and an M-Unit header share one format, a D layer for delivering the encapsulated media data from a specific entity to another entity in such a manner that an MMT Payload Format includes a header field for operations not supported by an RTP header, and a control layer for delivering the media data. An interface for media data transport and a media data transport method are described in detail below.

1. Proposed Delivery Overhead

In the present invention, it is considered that an overhead structure used in a delivery time (e.g., in case of an application that performs network streaming) and an overhead structure used in an encapsulation time (e.g., in case of an application of archiving files in a storage device) need to be separately defined, and an overhead structure upon delivery (when network streaming is performed) is described below.

From this point of view, the present invention proposes the following additional guidelines for overhead necessary at the time of delivery.

1. In case of a network streaming application, when media data generated from an encoder is packetized and transported, necessary header steps may include 2-step structures; (1) an AU level header and (2) a packet level header.

2. The Media Fragment Unit (MFU) header and the M-Unit (MU) header whose contents are written by an encoder share one format. The MFU header may be optionally extended in order to contain pieces of information associated with fragmentation within a single format.

3. All header fields necessary for operations that are not supported by the existing RTP header in the small layer of the MMT Payload Format and the small layer of the MMT packet existing in the D layer may be placed in an MMT Payload (MMTPL) format.

1.1 2-Step Structures for Delivery Overhead: Packet Level Header and AU Level Header If media data is streamed over a network, headers subsequent to the M-Unit written by an encoder includes 2-step structures; (1) the AU level header and (2) the packet level header. If media data is streamed, information that must be delivered from one side to the other side through packet transport may chiefly include the following three types.

(1) Information about a session level (e.g., information about the configuration of a session, such as the number of media included in the session, a codec type, and information about the configuration of a screen), (2) information about an AU level (e.g., a PTS-Presentation Timestamp: a presentation timestamp and information that must be attached to an AU level), and (3) information about a packet level (multiple units accommodated within one packet: aggregation, segmentation into several packets of one unit: fragmentation, and the multiplexing and packet error processing of a packet level)

The information about a session level may be commonly transported out of band through an additional transport channel, and this information does not need to be included in a packet header. Accordingly, in the present invention, the two layers; the AU level header and the packet level header are sufficient for a header at the time of transport, and the two layers are determined to be optimal. The AU level header may include all fields necessary when streaming is performed in the small layers of the E layer, and the fields of the small layers may not be explicitly distinguished from each other. However, the AU level header may include only one field depending on whether a field is a field whose contents are filled by an encoder or a field whose contents are filled by a system.

1.2 United Field for Media Fragment and M-Unit

The Media Fragment Unit (MFU) header and the M-Unit (MU) header whose contents are written by an encoder share one format, and the MFU header may be optionally extended in order to contain pieces of information associated with fragmentation in a single format.

If the MFU header and the MU header have different formats, an encoder may perform an additional task in order to determine whether up to any one of the two headers must be written. For example, an encoder that outputs fragments one by one requires a function of additionally checking the start and end points of the AU level of a stream that is outputted by the encoder in order to attach the MU header to the AU level while outputting the fragment. It is irrational to force all encoders to have the function by taking a condition that numerous types of codecs and relevant encoders exist into consideration.

1.3 Minimize MMT Packet (MPEG Media Transport Packet (MMTP)) Operation

In case of the D header, operations not supported by the existing RTP header may be placed in an MMT Payload (MMTPL) format.

The MMTPL format functions as a common layer that enables various media, used in the present MMT standard that will be newly defined, to be used even in the existing application standards, such as the RTP, in common. From this viewpoint, in order to utilize operations newly proposed by the present MMT delivery standard in an application that utilizes the existing application transport format, such as the RTP, only when a new function not supported by the existing protocol, such as the RTP, is placed in the MMTPL format, the new function can be operated in both transport through the RTP and transport through an MMTP.

2 Header Definitions: Characteristics and Operations

This paragraph illustrates a header structure according to the above-described design rule. The header of the two-level layer may include an M-Unit header as the AU level header. The header of the packet level may include an MMT payload header and an MMT packet header.

2.1 M-Unit Header (AU Level Header)

Figure 2:
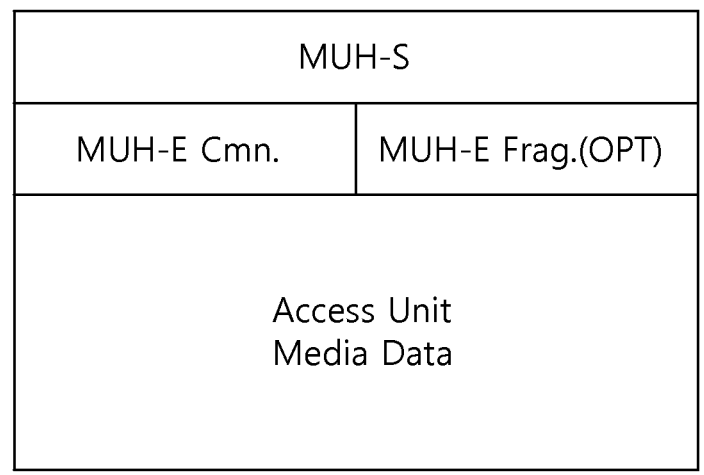
FIG. 2 schematically shows the structure of an M-Unit Header.

FIG. 2 schematically shows the structure of an M-Unit header.

As shown in FIG. 2, the M-Unit header is the header of the AU level, and one M-Unit has one M-Unit header. The M-Unit header may be divided into two parts; an M-Unit header for an encoder (MUH-E) and an M-Unit header for a system (MUH-S). An object of the MUH-E is to enable an encoder to fill fields, and the MUH-E includes pieces of information necessary for an encoder to perform efficient transport to a system. In contrast, an object of the MUH-S is to enable a system to fill fields, and the MUH-S includes pieces of information that must be processed by a system from a viewpoint of a relevant MU (AU).

The MUH-E basically includes a common field, and it may be optionally extended to have a fragment field. The common field includes common information related to a current MU as a basic field, and it is shared by an encoder that performs output in an AU unit and an encoder that performs output in a fragment unit. The fragment field is a field that may be extended to include pieces of information related to fragment segmentation, and it is used only when a current unit includes an AU part. Accordingly, the fragment field may be used only in an encoder that performs output in a fragment unit.

2.1.1. M-Unit Header for Encoder (MUH-E)

Figure 3:
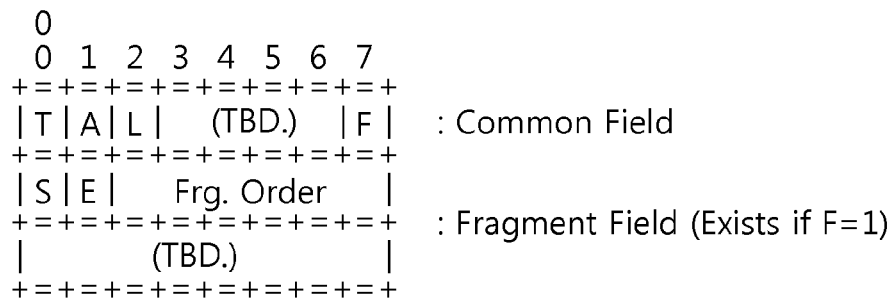
FIG. 3 is a diagram illustrating the structure of an M-Unit Header for an encoder.

FIG. 3 is a diagram illustrating the structure of an MUH-E

The contents of the MUH-E are filled by an encoder, and the MUH-E may include pieces of information that an encoder may provide them to a transport system in order to improve the transport quality of the transport system.

T: Timed Flag—It distinguishes whether the present unit is a Timed MU or a Non-timed MU (T=1: Timed MU, T=0: Non-timed MU). The Timed MU refers to media data in which the time when the media data will be outputted on a screen when the media data is actually played is clearly defined, and the Non-timed MU refers to common data in which the time when the data will be outputted on a screen when the data is actually played is not clearly defined.

A: Anchor Flag—It means that the start point of the present unit includes an anchor point when the A is indicated by 1. The anchor point refers to a point through which the middle of a stream can be accessed, such as random access. If a lower transport system that packetizes the present unit detects the anchor flag=1, the transport system must place the start part of the present unit in the start part of a packet when packetizing the present unit.

L: Lossless—It means that data included in the present unit must be transported without a packet loss when the L is indicted by 1.

F: Fragmented—It means that data included in the present unit includes the MFU as the fragment of an MU when the F is indicated by 1. The header field must be additionally followed by a fragment field.

S: Start of MU—It means that the present unit includes the first fragment of fragments segmented within one MU when the S is indicated by 1.

E: End of MU—It means that the present unit includes the last fragment of fragments segmented within one MU when the E is indicated by 1.

Furthermore, the two bits of the S and E may be integrated and used as one start_end_indicator field as follows. Here, a combination of the bits is the same as the S and E and may be used both in the MU and AU.

1. Start_end_indicator=01: It means the last fragment of an AU
2. Start_end_indicator=00: It means the middle fragment of an AU
3. Start_end_indicator=10: It means the first fragment of an AU
4. Start_end_indicator=11: It means that an MU includes only one AU Frg.Order: fragment order—It indicates that what fragment is the present unit, from among fragments segmented within one MU.

2.1.2. M-Unit Header for System (MUH-S)

FIG. 4 is a diagram illustrating an MUH-S.

The contents of the MUH-S are filled by a system, and the MUH-S includes pieces of information that is related to a current MU (AU) and provided by a system.

PTS: Presentation timestamp—It is time information for the screen display of a current M-Unit

2.2 MMT Payload Header and MMT Packet Header (Packet Level Header)

Figure 5:
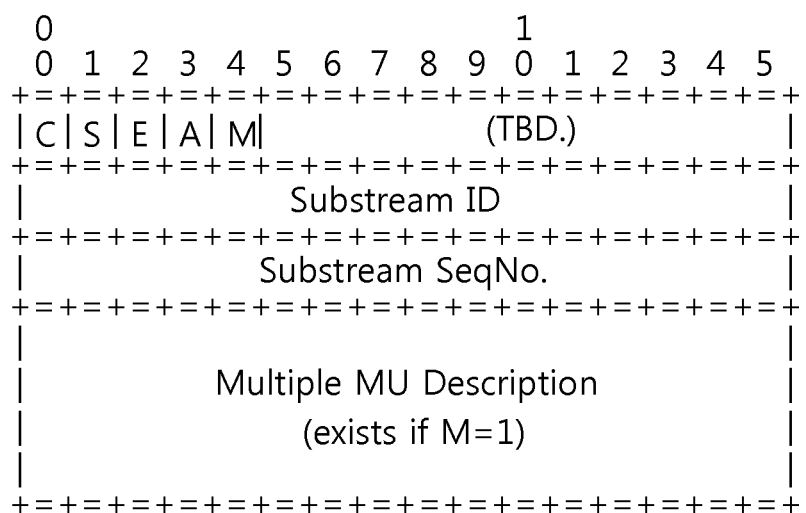
FIG. 5 is a diagram illustrating the structure of an MMT Payload Format.

FIG. 5 is a diagram illustrating the structure of an MMT payload format.

The MMT packet level may have headers of two steps. One of the headers is an MMT Payload (MMTPL) format header, and the other thereof is an MMT Packet (MMTP) header. One MMT packet includes one MMTPL format unit. In order for functions, newly designed in the MMT layer, to be used in an application using the RTP and an application using an MMTP at the same time, header fields corresponding to the newly designed functions must be placed in the MMTPL format header, and the MMTP inherits functions supported by the existing RTP, but can accommodate only minimum functions that cannot be supported by the MMTPL format header.

C: Control/Media Flag—It indicates whether this packet includes control information or media content (1:Control, 0:Media).

S: Start of unit—It indicates that the present packet includes the start part of an MU (or MFU) when the S is indicated by 1. Here, the unit is not limited to an MU (or MFU).

E: End of unit—It indicates that the present packet includes the end part of an MU (or MFU) when the E is indicated by 1. Here, the unit is not limited to an MU (or MFU).

A: Anchor—It indicates that the start part of the present packet includes the anchor point of media when the A is indicated by 1.

M: Multiple unit—It indicates that the present packet includes several MUs (or MFUs) when the M is indicated by 1. A "multiple MU Description" field is added to the last part of a header. In an embodiment, a multiple MU may be used as a multiple unit that accommodates other units other than an MU and may be used as a flag_multiple_unit.

Substream ID—It may function as an identifier for multiplexing different types of assets or packages for each packet. The Stream ID may perform a similar function as the PID of an M2TS. The actual allocation of this ID value is dynamically determined when a session is set up. In this case, mapping information transported in band or an additional session setup protocol transported out of band may be used.

Substream SeqNo.—It is a packet sequence number and is increased by 1 per packet for packet streams having the same substream ID.

FIG. 6 is a diagram illustrating the structure of an MMT packet header.

Sequence No.—It is the sequence number of a packet stream. The sequence number is increased by 1 according to a packet order.

Figure 7:
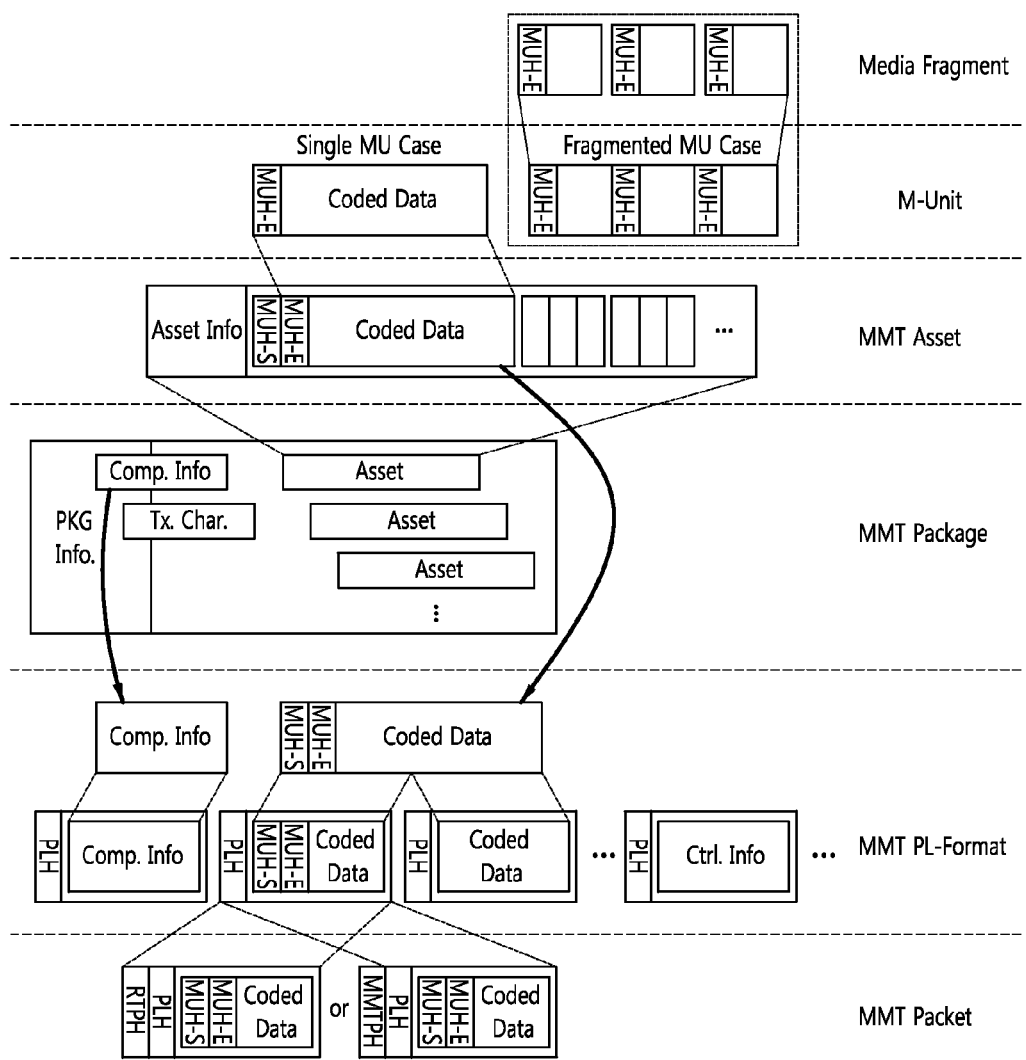
FIG. 7 is a diagram showing a process of media data (i.e., coded data), outputted from an encoder, being packetized for transport.

FIG. 7 is a diagram showing a process of media data (i.e., coded data), outputted from an encoder, being packetized for transport.

The encoder includes an encoder that performs output in an AU unit and an encoder that performs output in an MFU unit. The two encoders fill the common field of the MUH-E. The encoder that performs output in an MFU unit additionally extends and fills the fragment field of the MUH-E (see a Fragment MU Case in FIG. 7).

A streaming system that has inherited the extended and filled fragment field may form an MU (or MFU) stream in which the MUH-S has been attached to the MUH-E and produce an MMT Asset stream. Each MMT Asset stream includes additional "Asset Info", thus forming a standalone MMT Asset. The Asset Info may include supplementary information necessary for a current asset or information that needs not to be transported upon transport.

The standalone MMT assets for respective various codecs or media types configured as described above, together with screen composition information and transmission characteristic information, form an MMT package. The screen composition information may be transmitted through the MMT packet of a signal type or another out-of-band transport channel. Furthermore, transmission characteristic information about each MMT asset may be stored in the Asset Info or may be stored in an additional field within an MMT package.

At the time of streaming, a system may extract an MU (or MFU) from a standalone asset within an MMT package and select a proper packetization method depending on an available MTU packet size in a current network (merge or segment). Next, the system adds an MMTPL header (the PLH of FIG. 7) and an MMTP header to a packet and transports the packet through the UDP or TCP protocol of a lower layer. Here, the system may select a proper protocol depending on transmission characteristic information about each asset (UDP or TCP) or may select a policy for error processing, such as an application layer (FEC).

If an application uses an RTP protocol, the system may attach an RTP header after the MMTPL header and transport the packet.

Figure 8:
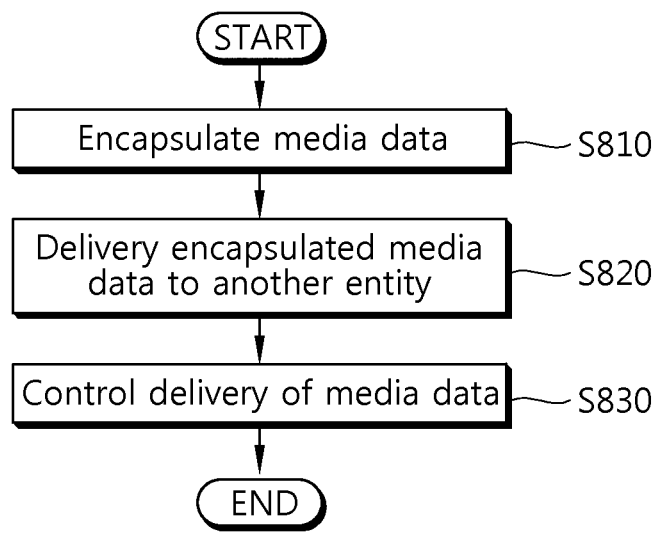
FIG. 8 is a flowchart illustrating a media data transport method based on a packet having a header with minimized overhead according to an embodiment of the present invention.

FIG. 8 is a flowchart illustrating a media data transport method based on a packet having a header with minimized overhead according to an embodiment of the present invention.

As shown in FIG. 8, in the media data transport method based on a packet having a header according to the embodiment of the present invention, first, media data is encapsulated so that a Media Fragment Unit (MFU) header and an M-Unit (MU) header share one format at step 810. That is, the MFU header and the MU header share one format, and an MFU may be extended as an option in order to contain pieces of information associated with fragmentation within a single format. If an MFU and an MU have different formats, an encoder may need to perform an additional task in order to determine up to which one of the headers must be written.

Next, header fields for operations not supported by an RTP header are included in an MMT Payload Format, and the encapsulated media data is delivered from a specific entity to another entity at step 820. In order for operations, newly proposed in the present MMT delivery standard, to be utilized in an application that reuses the existing application transport format, such as the RTP, a new function not supported by the existing protocol, such as the RTP, must be placed in the MMT Payload Format. In this case, the new function can be operated both in transport through the RTP and transport through the MMTP.

Next, in the media data transport method according to the embodiment of the present invention, the delivery of the media data is controlled at step 830.

The invention claimed is:

1. An apparatus for generating packet by packetizing media data, the apparatus comprise:
    an encapsulation unit configured to generate a media unit by encapsulating media fragment unit (MFU), generate an asset based on the media unit, and generate an MMT package by encapsulating one or more assets, the MFU comprising data processed by media decoder, the media unit comprising codec independent format, the asset comprising one or more media units, and the package configured to comprise one or more assets along with additional information including composition information (CI) and transport characteristics (TC); and
    a packetization unit configured to generate a payload for transport of the MMT package and generate the packet by constituting the media unit included in the asset as the payload,
    wherein the packetization unit generates the packet including a fragmentation indicator of 2 bits indicating information associated with a fragmentation of a predetermined data unit, in a header of the payload, and
    wherein the fragmentation indicator indicates four states through a predetermined bit value,
    and wherein the predetermined bit value indicates (i) whether the payload contains a first fragment of the predetermined data unit, (ii) whether the payload contains a last fragment of the predetermined data unit, (iii) whether the payload contains a fragment that is neither the first nor the last fragment of the predetermined data unit, and (iv) whether the payload contains a complete data unit,
    and wherein the transport characteristics comprises information related to transport of the asset,
    and wherein the packet further comprises an identifier for distinguishing assets having different characteristics for each packet.

2. The apparatus of claim 1,
    wherein the predetermined data unit comprises at least one of the media fragment unit, the media unit and access unit (AU).

3. The apparatus of claim 1,
wherein the packetization unit generates the packet, in the payload, further including a timed flag indicating whether data unit in the packet is timed media data or non-timed data unit.

4. The apparatus of claim 3,
wherein when a value of the timed flag is 1, the timed flag indicates that the data unit is timed media data and when the value of the timed flag is 0, the timed flag indicates that the data unit is non-timed media data.

5. The apparatus of claim 1,
wherein the packetization unit generates the packet further including a sequence number that is increased by 1 per packet for distinguishing packets having the same said identifier.

6. The apparatus of claim 1,
wherein the packetization unit generates the packet further including a sequence number that is increased by 1 per a packet transmission.

7. The apparatus of claim 1,
wherein the encapsulation unit encapsulates media data so that the media fragment unit header and media unit header share one format.

8. The apparatus of claim 1,
wherein the packetization unit generates the packet including header fields for operations not supported by an RTP header in the payload.

9. A method for generating a packet by packetizing media data, the method comprise:
generating a media unit by encapsulating a media fragment unit (MFU) and generating an asset based on the media unit, and generating an MMT package by encapsulating one or more assets, the MFU comprising data processed by media decoder, the media unit comprising codec independent format, the asset comprising one or more media units, and the package configured to comprise one or more assets along with additional information including composition information (CI) and transport characteristics (TC);
generating a payload for transport of the MMT package and generating the packet by constituting the media unit included in the asset as a payload,
wherein the generating the packet comprises generating the packet including a fragmentation indicator of 2 bits indicating information associated with a fragmentation of a predetermined data unit, in a header of the payload,
and wherein the fragmentation indicator indicates four states through a predetermined bit value,
and wherein the predetermined bit value indicates (i) whether the payload contains a first fragment of the predetermined data unit, (ii) whether the payload contains a last fragment of the predetermined data unit, (iii) whether the payload contains a fragment that is neither the first nor the last fragment of the predetermined data unit, and (iv) whether the payload contains a complete data unit,
and wherein the transport characteristics comprises information related to transport of the asset,
and wherein the packet further comprises an identifier for distinguishing assets having different characteristics for each packet.

10. The method of claim 9,
wherein the predetermined data unit comprises at least one of the media fragment unit, the media unit and access unit (AU).

11. The method of claim 9,
wherein the generating the packet comprising generating the packet, in the payload, further including a timed flag indicating whether data unit in the packet is timed media data or non-timed data unit.

12. The method of claim 11,
wherein when a value of the timed flag is 1, the timed flag indicates that the data unit is timed media data and when the value of the timed flag is 0, the timed flag indicates that the data unit is non-timed media data.

* * * * *